April 21, 1953     A. E. OSBORN     2,635,901
JOINT FOR SMOOTH-SURFACED PIPE
Filed Dec. 27, 1946
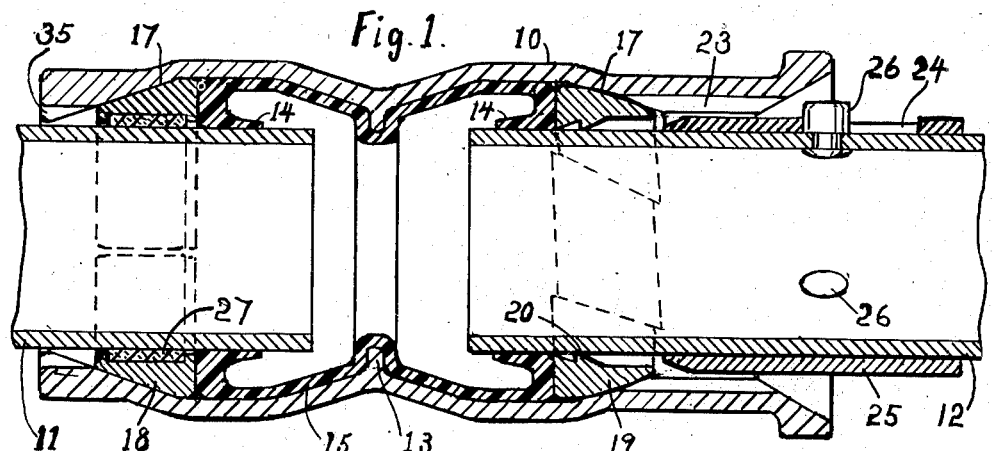
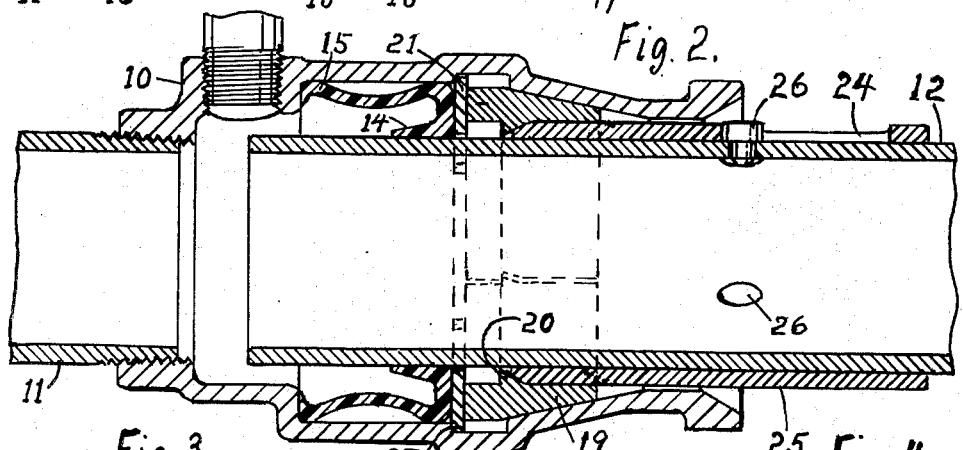
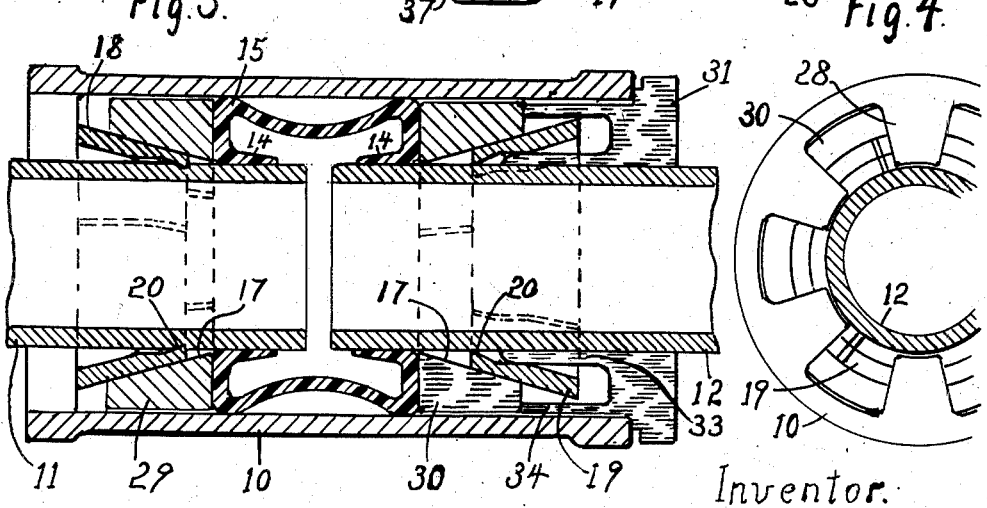
Inventor.
Alden E. Osborn.

Patented Apr. 21, 1953

2,635,901

UNITED STATES PATENT OFFICE 2,635,901

JOINT FOR SMOOTH-SURFACED PIPE

Alden E. Osborn, Mount Vernon, N. Y.

Application December 27, 1946, Serial No. 718,694

5 Claims. (Cl. 285—163)

This invention relates to an improved pipe joint or coupling means which provides that plain end pipe or other cylindrical members can be connected together or attached to fittings by simply pressing the pipe into position into the coupling or fitting without requiring the use of tools. My invention also provides a simple and easy means for disconnecting the pipes from couplings or fittings employing an expandable lock ring means to retain the pipe in position. It further provides a means for positioning couplings on the ends of the pipes to be connected whereby the coupling would be centralized without requiring measurements or special skill on the part of those doing the assembling operation.

In the accompanying drawing

Fig. 1 represents a longitudinal sectional view of a coupling embodying two forms of my invention, Fig. 2 represents a longitudinal sectional view of a fitting or pipe extension and illustrates a modified form of my invention, Fig. 3 represents a longitudinal sectional view of a coupling and shows a still further modification and Fig. 4 represents a partial end view of the coupling illustrated in Fig. 3.

My present invention embodies the feature of the utilization of the longitudinal expansion of the gasket or packing means and the pressure of the pipe contents to contract the pipe-holding means, according to the principle disclosed in my Patent No. 2,479,960, dated August 23, 1949, in combination with certain other features hereinafter described and claimed.

In Fig. 1 11 and 12 represent the pipes or cylindrical members to be connected and 10 represents the coupling or socket member into which the ends of the pipes are to be fastened. The coupling contains an internal channel that is provided in its center with an internally extending flange 13, which flange projects into the gasket or packing member 15 that extends about this flange and rests against the interior of the channel and is shown as provided with inwardly extending lips 14 that are pressed against the pipes by the pressure of the contents of the pipes acting on their exterior surfaces in the usual manner with gaskets of this type. The coupling channel is provided with end walls having slanting surfaces 17 that may be either straight or spherical and contains, in addition to the gasket, and at each side thereof, two lock rings 18 and 19, which rest against these slanting surfaces, so that, when pressure is exerted on them in a longitudinal direction, they are caused to contract against the pipes 11 and 12. As shown in this figure one of these rings, which is preferably in three or more sections, is provided at the inner edge of the inside surfaces with a cutting edge 20 that is preferably of a harder material than that out of which the pipes are made. While the couplings, as produced, would usually have both ends of the gasket 15 and both of the lock rings 18 and 19 of the same form, I have, in Fig. 1, shown the lock ring 18 and adjacent gasket end of a somewhat different form than the lock ring 19 and adjacent end of the gasket, in order to illustrate two different methods of preventing the gasket from being forced by internal pressure into the opening of the lock ring segments when the lock rings are expanded by the pipe before the ring has been seated on the pipe and reduced to their normal size. At the lock ring 18 end, the gasket is shown relatively thick in order to stiffen it at this point, altho other stiffening means can be used, so that, when the lock ring segments are fully separated, the gasket would not be forced into the segment opening to an undesirable extent. At the lock ring 19 end the segment ends, as shown by the dotted lines, are formed at an angle, so that, when the ring is contracted the segments would lap over each other while, when the ring is expanded, the segments would straighten out and not permit an excessive opening between them and the depression in the pipe would be formed into an approximately straight line. It will be noted that at the lock ring 19 end of the coupling a spherical slanting surface is shown on both lock ring and collar, as with surfaces of this form on these parts it is possible to allow for a small amount of annular displacement of the pipe which is desirable in some installations.

At the ring 18 end of the coupling or fitting 10, a modified method of holding the pipe 11 is shown, which comprises providing the inner surface of the ring with a friction facing 27 having a greater coefficient of friction than the outer tapered surface of the ring and the internal tapered surfaces 17 of the coupling or fitting 10 against which the ring bears. High contracting pressure brought on the ring both by the pressure of the internal fluid of the pipe acting longitudinally on the gasket and the relatively small angle of the lock ring and coupling tapered surfaces and also because the friction of the pipe on the inside of the lock ring compared to the friction of the tapered surfaces causes the ring to be drawn towards the smaller diameter of the tapered surfaces even without the assistance of the gasket pressure. While the friction facing 27 is shown as being a separate quite thick material in proportion to the thickness of the lock ring 18, any method of increasing the coefficient of friction of the inside of the ring in proportion to the friction of its outer surface, can be used that would tend to cause the ring to move with the pipe 11 into its wedging position inside of the coupling taper 10.

While the lock ring 18 is shown with straight tapered surfaces to hold the pipe rigidly the lock ring 19 is shown with spherical surfaces to permit some angular movement of the pipe, as either form of wedging surfaces can be used.

It will be seen that to connect the pipes it is necessary to push them into the coupling as far as possible when they will at first be held by the contraction of the lock rings thru the longitudinal expansion of the gasket and will thereafter be more positively locked in position by the admission of the pressure of the contents of the pipe to the interior of the gasket to cause its further longitudinal expansion. The longitudinal pressure on the lock rings 18 and 19 and the contracting pressure on the pipes depends on the internal pipe pressure, and the angle of the slanting surfaces of the lock rings. The pressure, unless the material of the pipe is very hard, would, with the type of ring illustrated at 19, be sufficient to start the cutting edges 20 of the lock rings into the pipe to an extent to cause them to dig into the pipe surfaces and positively lock the pipe when an attempt is made to pull the pipe out of the coupling. It will also be noticed that more pressure could be concentrated on the cutting edges if they do not extend completely around the inner surfaces of the lock rings but that, in this case, the lock rings would cause a series of circumferential indentations around the exterior of the pipe instead of a substantially complete circle, as would be the case when the cutting edge extends over the entire inner segment circumferences.

As above described no special method for disconnecting the pipe is provided. However, as it would be desirable to provide for pipe disconnection, I have shown in Fig. 1 two different methods. At the pipe 11 end I have shown keyways or notches 35 in the end of the coupling 15 thru which a tool or tools can be thrust against the inner tapered surface of the lock ring in the same way as illustrated and described in my Patent No. 2,479,960. At the pipe 12 end I have, however, provided an entirely different disconnecting means which comprises a slotted sleeve 25 loosely surrounding the pipe 12 and pins or bosses 26 (preferably three) on the outside of the pipe and entering slots 24 in the sleeve. The inside surface of the adjacent end of the coupling is provided with keyways 23 thru which the ends of the pins 26 can be passed when the pipe is turned to a position which lines up the ends of the pins with the keyways. The pins 26 are so located on the pipe 12 that, when they strike the end of the coupling 10 the sleeve 25 will not enter the coupling to a sufficient extent to engage and expand the lock ring 19 and the pipe 12 would be locked in place by the ring, while, when the pipe 12 is turned to allow the pins 26 to enter the keyways 23 the pipe can be pushed far enough into the coupling to allow the sleeve 25 to enter and expand the lock ring 19 where it will remain until the pipe is pulled far enough out of the coupling to have its end moved out of the lock ring, because of the lost motion between the pins 26 and sleeve 25. Thus the pipe is simply pushed into the coupling to connect the same while to disconnect, it is turned slightly to line up the pins 26 and keyways 23 and pushed entirely into the coupling when it is released by the expansion of the lock ring 19 and can be readily drawn out. This quick disconnecting means and the tapered enlargement of the coupling ends can also be applied to the other end of the coupling, but would not usually be required at both ends.

In Fig. 2, a modified form of this joint mechanism, shown at the pipe 12 end of Fig. 1, is illustrated applied to the joint in a channel coupling or fitting attached to the pipe by other means. In this figure the fitting 10 has the gasket 15 and lock ring 19 in the internal channel and, in addition, it contains a washer 21 (which can be split to permit insertion) between the gasket and lock rings, which washer serves to prevent the gasket from entering the openings between the lock ring segments when the lock ring is expanded. The lock ring is shown as modified by being arranged with an internally projecting ridge or cutting edge 20 adapted to cause a circumferential indentation (or indentations) in the exterior of the pipe when the pressure of the contents of the pipe is applied to the gasket. A feature of the channel illustrated in Fig. 2 is provision of a shoulder 37 in the interior of the channel that restricts the compression of the gasket by preventing an unlimited movement of the washer 21. This figure also shows the lock ring expander of Fig. 1 for quick disconnection of the pipe except that the keyways 23 and extended ends of the pins 26 are eliminated. With this form of my mechanism the coupling of the pipe is accomplished by pushing the pipe into the fitting until the resistance of the sleeve 25 coming into contact with the tapered end of the lock ring 19 is felt when the end of the pipe would be within the lock ring and in a position to be held in the fitting when pressure is admitted to the gasket— the restraining of the movement of the pipe, when the sleeve 25 and lock ring 19 comes into contact, being the indication that the pipe is in the correct position for the locking action. To release the pipe, the pipe is pushed against this resistance and as far as possible into the fitting so that the sleeve 25 is forced into the lock ring 19, in which position it is shown, when the pipe can be pulled out of the coupling, as explained in the description of Fig. 1.

In Figs. 3 and 4 is shown a further modification of my invention applied in this case to a coupling. In these figures the coupling 10 is fitted with internally projecting fingers 28 at each end with the space between forming the channel in which the gasket 15, lock rings 18 and 19 are placed. The lock rings do not, in this form, bear directly against the slanting surfaces of the coupling, but engage two rings 29 and 30 having internal slanting surfaces 17 which rings are between the lock rings 18 and 19 and the gasket 15 and are the parts moved longitudinally by the expansion of the gasket, as the lock rings, in this form, do not move longitudinally. It will be noted that the lock rings 18 and 19 are shown in Fig. 3 as being of the type having the internally sharp edge similar to the rings shown in Figs. 1 and 2, but obviously other forms of rings can be used. This form of my invention is illustrated with a coupling casing which does not have the central positioning flange 13 as, in some cases, a means for centralizing the coupling is undesirable, as it is necessary to put the coupling entirely on one pipe and to move it onto both pipes after the pipes have been lined up. The pipe is connected, with this form of my invention, in exactly the same way as with the other forms. However, to disconnect this form it is necessary first to push the internally tapered rings 29 and 30 against the action of the gasket 15 to permit the expansion of the lock rings 18 and 19 and thereafter to lift the lock rings. This can be accomplished by means of the special tool 31, somewhat similar to that disclosed in my aforesaid patent, consisting of two half-circles (shown on the line of division) that have projecting arms that can be pushed thru the opening between the inwardly projecting fingers 28 on the coupling collar 10 and which, in this case, has an outer circle of arms 34 and an inner circle 33. Thus, when the tool 31 is pressed into the coupling 10, the tapered rings 29 and 30 are first moved to release the lock rings by the outer arms 34, and thereafter the lock rings 18 and 19 would be expanded by the inner shorter arms 33, allowing the pipes to be removed.

It should be understood that the various features of my invention as disclosed and hereinafter claimed may be combined in different ways in a single joint or coupling unit, and that all of the possible arrangements of these features and modifications within the scope of my claims have not been disclosed herein.

I claim:

1. A coupling means for connecting a cylindrical member to an internally channelled socket member comprising a packing gasket and an expandable lock means in said channel, and means for releasing said expandable lock means from said cylindrical member, comprising a loosely mounted member adapted to move with said cylindrical member when said cylindrical member is inserted into said socket member and to lift said lock means from said cylindrical member, and a key on said cylindrical member and a keyway in said socket member, whereby the movement of said cylindrical member into said socket member is limited to a predetermined extent and said loosely-mounted member is prevented from expanding said lock means when said cylindrical member and socket member are not in a relative angular relation to allow said key to pass into said keyway, and whereby, when said cylindrical member is rotated to allow said key to enter said keyway, said cylindrical member and said loosely-mounted member can be moved to cause said loosely-mounted member to expand said lock means, and a lost-motion connection between said cylindrical member and said loosely-mounted member, whereby said loosely-mounted member can remain in said lock means expanding position while said cylindrical member is being withdrawn from within said lock means.

2. A coupling means for connecting a cylindrical member to an internally channeled socket member adapted to surround an end portion of a cylindrical member, comprising a packing gasket in said channel and a circumferentially arranged expandable lock means formed of a plurality of separable segments also in said channel at the side of said gasket with each said segment having an end portion that overlaps an end portion of the adjacent segment when said lock means is contracted and with some of said segments being out of line with other adjacent segments whereby substantially all openings between said lock ring segments, through which said gasket might be pressed, are eliminated both when said lock ring is in its contracted position and when said lock ring is expanded.

3. A coupling means for connecting cylindrical members to an internally channeled socket member adapted to surround an end portion of said cylindrical members, comprising a means for retaining said cylindrical members in said socket member, a gasket in said channel adapted to bear upon the exterior surface of each of said cylindrical members, and a means for centralizing said socket member and said gasket in relation to said cylindrical members comprising a circumferential internally-projecting rib in said channel and attached to said socket member with said gasket covering the entire interior surface of said socket member between its said bearings on the exterior surface of said cylindrical members including the sides and top of said internal socket member rib.

4. A coupling means for connecting two cylindrical members having substantially smooth external surfaces, comprising an internally channel socket member surrounding an end portion of each said cylindrical member and having within said channel an internal tapered surface adjacent to each end thereof, two circumferentially arranged expandable lock means in said channel, with each lock means having an external tapered surface engaging each said internal tapered surface of said socket member and with each said lock means also having an internal non-slip surface engaging each said cylindrical member, and a packing gasket also in said channel and between said lock means, with said gasket having parts pressing against an exterior surface of each of said cylindrical members by fluid pressure from within said members and also having parts bearing oppositely on said lock means to, both thru the elasticity of said gasket and thru said fluid pressure acting on said parts of said gasket, longitudinally move said lock means apart whereby said movement of said lock means and the action of said cooperating tapered surfaces, causes the forcible contraction of each said lock means upon an exterior surface of each said cylindrical member and retains both of said cylindrical members in said socket member.

5. A coupling means for connecting a cylindrical member having a substantially smooth external surface to an internally channeled socket member adapted to surround an end portion of said cylindrical member, comprising a packing gasket in said channel, a circumferentially arranged expandable lock means, having a cylindrical member-engaging internal surface with a relatively high co-efficient of friction, in said channel at the side of said gasket, and a shoulder means, comprising cooperating internal and external relatively movable slanting surfaces on said socket member and said lock means with each said surface having a relatively low co-efficient of friction, to, when said slanting surfaces of said shoulder means are given a relative movement by the longitudinal expansion of said gasket, centralize said lock means and to also contract said lock means and cause the said internal high co-efficient of friction surface thereon to forcibly press against and retain said cylindrical member in said socket member.

ALDEN E. OSBORN.

References Cited in the file of this patent

UNITED STATES PATENTS

| Number | Name | Date |
|---|---|---|
| 769,896 | Gapp | Sept. 13, 1904 |
| 1,930,194 | Dillon | Oct. 10, 1933 |
| 2,017,994 | Spang | Oct. 22, 1935 |
| 2,111,956 | Baldwin | Mar. 22, 1938 |
| 2,182,797 | Dillon | Dec. 12, 1939 |
| 2,259,453 | Beyer et al. | Oct. 21, 1941 |
| 2,479,960 | Osborn | Aug. 23, 1949 |

FOREIGN PATENTS

| Number | Country | Date |
|---|---|---|
| 443,375 | Great Britain | Feb. 27, 1936 |